Patented Mar. 30, 1926.

1,579,169

UNITED STATES PATENT OFFICE.

GIUSEPPE VENOSTA, OF MILAN, ITALY.

MANUFACTURE OF DIPPED RUBBER GOODS.

No Drawing.　　Application filed March 12, 1924. Serial No. 698,804.

*To all whom it may concern:*

Be it known that I, GIUSEPPE VENOSTA, a subject of the King of Italy, residing at Milan, Italy, have invented certain new and useful Improvements in the Manufacture of Dipped Rubber Goods, of which the following is a specification.

The present state of the art consists in manufacturing many rubber goods like gloves for medical or chemical use, teats, bladders, bath-caps, toys or the like composed of thin seamless films, by dipping a suitable former in a rubber solution or cement and then causing the solvent to be evaporated, leaving a thin layer of rubber. This operation is repeated as many times as it is necessary to obtain the required thickness. The solutions or cements used presently in the rubber-industry contain as solvents organic liquids as benzene (benzol), gasoline, solvent naphtha, carbon disulphide or the like. The films thus obtained are generally vulcanized by the cold cure through the agency of sulphur chloride vapours or solutions, or they may be vulcanized at moderate heat (50–60° C.) using in a suitable manner some ultrarapid accelerator.

These seamless articles are from many points of view much preferable to those manufactured from cut sheets or from calendered sheets. On the other hand they have the disadvantage of aging very quickly. Moreover the preparation of the rubber solutions involves a considerable amount of work and expense and a further expense is caused by the loss of the evaporating solvent, which latter can only be recovered by means of machinery which is very expensive and very dangerous to use.

I have now found that a much better result may be obtained by using instead of a rubber solution or cement the latex of Hevea or of other caoutchouc-bearing trees, after having purified it by filtration. To the latex may of course be added, when necessary for the transportation and preservation of it, a suitable amount of ammonia or other anticoagulants as is now done with the latex imported for other purposes. These anticoagulants are not essential for the results of the procedure here outlined, but they have no harmful effect on the same.

A particularly good result is obtained by using a latex that has previously been artificially concentrated by evaporating a large proportion of its water-content, bringing it, for example, to 60–70% rubber content.

The latex may also be subjected to a dialyzing process for the purpose of eliminating all or part of its non-colloidal constituents and after that may be concentrated or not.

The formers are dipped in the latex, concentrated or dialyzed or not, and its water-content is evaporated leaving behind a thin rubber film. This film is transparent when dry and the transparence may be taken as an indication of its completed drying. Many layers may thus be superposed until the desired thickness is reached.

The evaporation may take place at ordinary temperature, but it may be furthered by a current of air or other gas warmed to a moderate temperature.

The rubber thus obtained contains, in addition to the caoutchouc proper, all the natural constituents of the latex, which is highly beneficial to the mechanical and aging properties of the goods prepared.

The vulcanization may be effected by the cold cure process as usual.

Or it is possible to dissolve or suspend or disperse in the latex, after its concentration or dialysis the required amounts of sulphur, accelerators, oxides or other fillers, which remain deposited within the film intimately intermixed with the rubber, and after the evaporation to vulcanize by the hot-cure. Or one of these agents, for example, the sulphur, may be added after the evaporation by scattering it on the surface of the object and afterward vulcanizing by moderate warming, for example, at 50–60° C.

A most important property of the film obtained by evaporation of the latex is their great absorbing power for several substances and particularly for accelerators. It is easy to take advantage of this property by dispersing in the latex, concentrated, dialyzed or not the sulphur and a suitable metallic oxide, and introducing an accelerator by absorption from the exterior surface of the object and afterwards vulcanizing it by heating it at suitable temperature.

Having thus described the nature of my invention, what I claim is:

1. A process for producing seamless rubber goods consisting in dipping a suitable former in the previously-dialyzed latex of a caoutchouc-bearing plant evaporating the water-content of the latex, and vulcanizing the object thus obtained.

2. A process for producing seamless rubber goods consisting in dipping a suitable former in the latex of a caoutchouc-bearing plant which has first been dialyzed and afterwards concentrated, evaporating the remaining water-content of the latex, and vulcanizing the object thus obtained.

3. A process for producing seamless rubber goods consisting in dipping a suitable former in the latex of a caoutchouc-bearing plant to which sulphur and a metallic oxide have been added, evaporating its water-content introducing into the film thus obtained an accelerator by absorption from the external surface, and vulcanizing by heating at a suitable temperature.

4. A process for producing seamless rubber goods consisting in dipping a suitable former in the previously-concentrated latex of a caoutchouc-bearing plant, to which sulphur and a metallic oxide have been added, evaporating its remaining water-content introducing into the film thus obtained an accelerator by absorption from the exterior surface, and vulcanizing by heating at a suitable temperature.

5. A process for producing seamless rubber goods consisting in dipping a suitable former in the previously-dialyzed latex of a caoutchouc-bearing plant, to which sulphur has been added, evaporating its water-content, and vulcanizing the object thus obtained by heating at a suitable temperature.

6. A process for producing seamless rubber goods consisting in dipping a suitable former in the previously-dialyzed latex of a caoutchouc-bearing plant to which sulphur and a metallic oxide have been added, evaporating its water-content, introducing into the film thus obtained an accelerator by absorption from the exterior surface, and vulcanizing by heating it at a suitable temperature.

7. A process for producing seamless rubber goods consisting in dipping a suitable former in the latex of a caoutchouc-bearing plant, previously dialyzed and afterwards concentrated, to which sulphur has been added, evaporating its remaining water-content and vulcanizing the object thus obtained by heating it at a suitable temperature.

8. A process for producing seamless rubber goods consisting in dipping a suitable former in the latex of a caoutchouc-bearing plant, previously dialyzed and afterward concentrated, to which sulphur and a metallic oxide have been added, evaporating its remaining water-content introducing into the film thus obtained an accelerator by diffusion from the exterior surface, and vulcanizing by heating it at a suitable temperature.

In testimony whereof I affix my signature.

GIUSEPPE VENOSTA.